Figure 1:
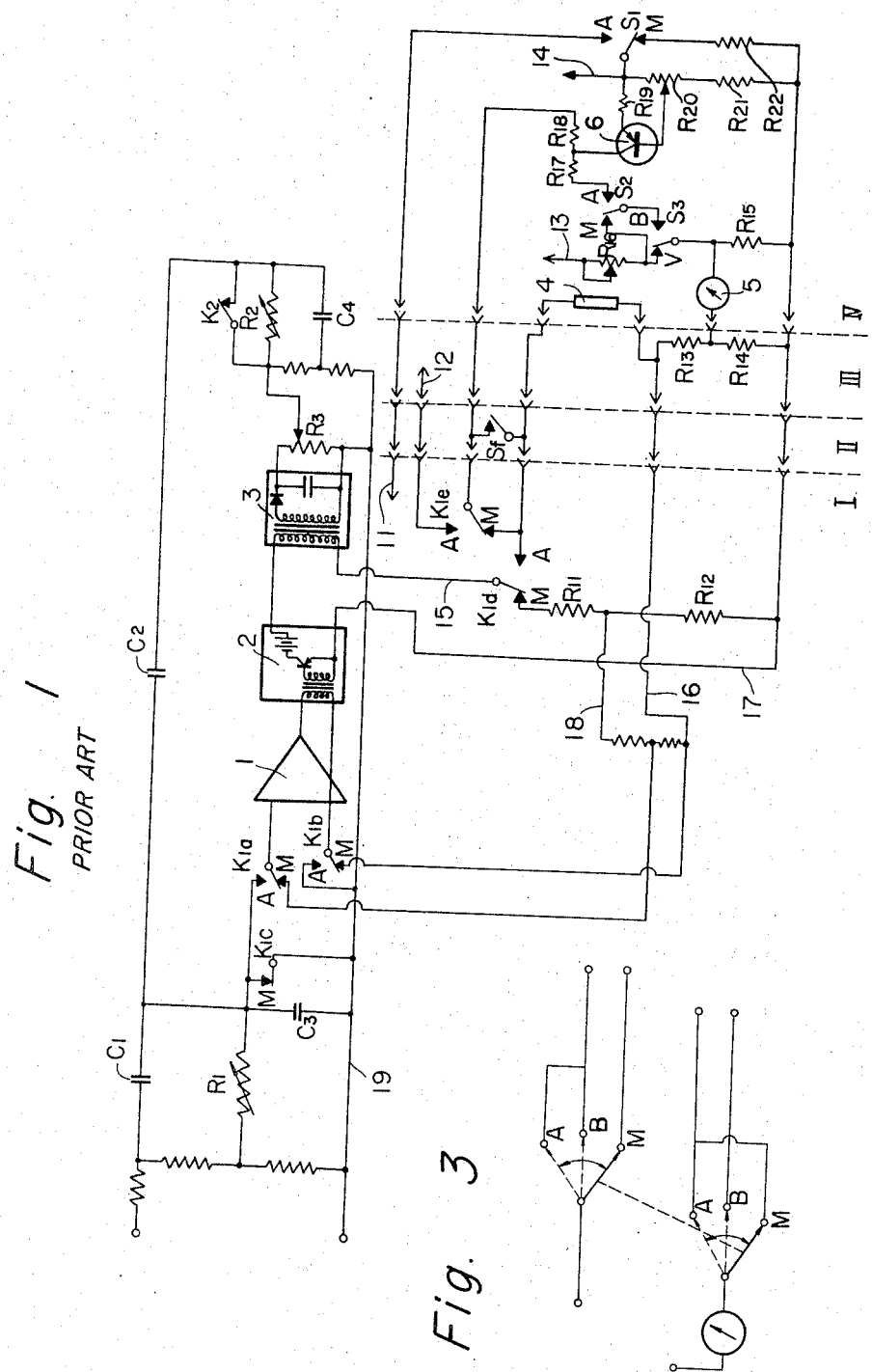

United States Patent Office 3,340,408
Patented Sept. 5, 1967

3,340,408
AUTOMATIC AND MANUAL CHANGE OVER SYSTEM FOR ELECTRONIC CONTROLLING INSTRUMENTS
Shinichiro Ogawa, Chuo-ku, Tokyo, and Masayoshi Tanaka, Toshima-ku, Tokyo, Japan, assignors to Honeywell Inc., a corporation of Delaware
Filed Dec. 3, 1963, Ser. No. 327,780
Claims priority, application Japan, Feb. 28, 1963, 38/8,697
2 Claims. (Cl. 307—112)

This invention relates to an automatic and manual change over system for an electronic controlling instrument and, more particularly, the present invention relates to an automatic and manual change over system for an electronic process controller in which the change over is effected by means of a single unidirectional one change over switch.

The electronic process controller, or electronic process controlling instrument, of the present invention receives an error signal formed by a signal from an automatic sensor which has been compared against a set point signal. An output signal is produced thereby for controlling a final control element, referred to herein as the load. The signal from the automatic sensor, referred to as the process variable signal, may represent such process components as, pressure, flow rate, temperature, thickness, or any other physical, electrical, or chemical condition. The error signal, formed from a comparison of the process variable and set point signals, is utilized by the controller for providing an output signal which automatically adjusts the load, such as a pump, valve, or heater, for automatically returning the process variable to its set point and, thereby, eliminating the necessity for manual control. A typical prior art electronic process controlling instrument utilizes three functions for characterizing the output signal and thereby maintaining the controlled process at its set point. The first function is proportional band which is the ratio of the full-scale swing of the output signal, and in turn the load, to the deviation of the error signal. In controllers utilizing only the proportional band function the error signal is never fully eliminated since it is virtually impossible to reduce the error signal to zero with a single function controller. This inherent deviation between the actual process condition and the desired process condition is called "droop" and may be reduced by the use of a high gain amplifier. In many controllers the high gain amplifier produces instability and therefore a second function, reset, is introduced to minimize the amount of droop and allow the use of an amplifier having a higher gain than otherwise possible. The reset function operates after the proportional band function for establishing a characterized output signal which slowly returns the load to the desired set point position. The reset function may be considered as a characterization of the output signal in accordance with the time integral of the error signal. The greater the extent of deviation of the process variable from the set point the greater will be the speed at which the reset function proportionally adjusts the load for subsequently returning the process variable to the set point. In the situation where the deviation of the process variable from the set point is a rapid one, the utilization of the proportional band and rest functions alone will not produce a sufficient output signal for rapidly adjusting the final control element. To overcome this problem a third function, rate, is introduced into the control cricuitry of the process controller. The rate function may be considered as a means for producing an output signal which is a function of the rate of change of the error signal. It compares the rate of speed at which the process variable changes from the set point and momentarily delays the passage of a feedback signal to the amplifier for permitting the controller to produce a characterized output signal of disproportionate magnitude thereby producing a rapid shift in the position of the load. A typical example of a prior art controller incorporating the proportional band, reset, and rate functions may be found in a U.S. Patent No. 3,081,425, by W. F. Newbold, which issued Mar. 12, 1963 and is assigned to the common assignee.

In general, an electronic process controlling instrument is comprised of a controller and a manual manipulator. That is, the load may be automatically controlled by the electronic process controlling instrument just described; or it may be switched over, by suitable switching means, for controlling the load manually with a manual manipulator. The switching from the controller, or automatic mode, to the manual manipulator, or manual mode, should be as smooth as possible so as not to shock the load. Conversely, the switching from the manual mode to the automatic mode should also be smooth.

Many circuits for switching, or changing over, the electronic process controlling instrument have been proposed. These arrangements include a separate balance mode which is utilized for switching from the manual mode to the automatic mode and also for switching from automatic to manual modes. As indicated from its name, the balance mode serves to lock the electronic process controlling instrument in a hold position while the output from the manual manipulator is adjusted to equal the output of the controller. The electronic process controlling instrument may then be changed over from the automatic mode to the manual mode without shocking the load. In early devices, the balance mode was also utilized when changing over from the manual mode to the automatic mode. Later arrangements provide for a change over from manual to automatic modes in one step without going through the balance mode. This is achieved by connecting the input of the controller to a dummy load, during the manual mode, and allowing the controller to track the effect of the manual manipulator on the load. The manual manipulator, due to the fact that it is a manual device, can not adjust itself for tracking the effect of the controller on the load during the automatic mode. Thus, when a change over from automatic to manual mode is required, it is necessary to make the output of the manual manipulator coincide with the output of the controller and therefore one step change over cannot be adapted.

It is, therefore, an object of this invention to provide an electronic process controlling instrument in which a simplified and reliable change over operation is effected and in which a change over system from an automatic to a manual mode of operation is provided.

Figure 2:
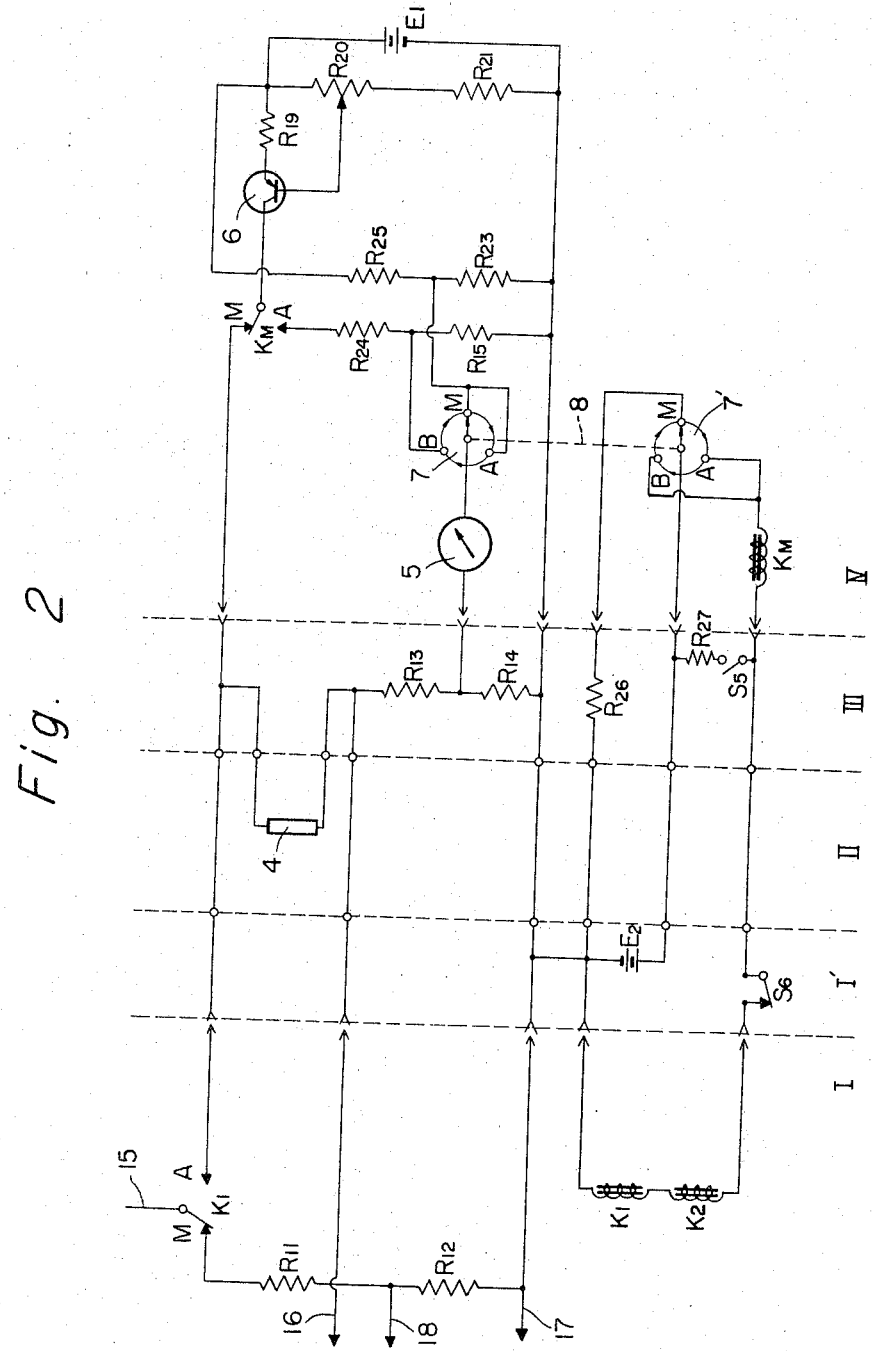

Other objects and advantages of this invention will become readily apparent from the following detailed description, in which:

FIG. 1 shows the connection diagram of a typical prior art electronic process controlling instrument, and FIG. 2 shows the connection diagram of the present invention in which an automatic to manual and manual to automatic change over system is employed.

Referring now to the drawings, and more specifically to FIG. 1, a typical electronic process controlling instrument of the prior art is shown wherein I is a controller, II is a cable and III and IV are manual manipulators. This electronic process controlling instrument is typical of an instrument manufactured by the assignee of the present invention, as shown in publication No. 333-2, Issue 3, and a complete description or explanation, thereof, is neither required nor necessary here. However, for a better understanding of the present invention, those portions of the circuit relating thereto will be described. Assuming that automatic and manual change over switches $S_1$ and $S_2$ are in the manual mode or M position, relays $K_{1a}$, $K_{1b}$, $K_{1c}$, $K_{1d}$, $K_{1e}$ and $K_2$ make up a circuit as shown in FIG. 1.

A manual controlling signal is produced across a resistor $R_{20}$ by a power supply whose positive terminal is connected to the resistor $R_{20}$ and whose negative terminal connects through a resistor $R_{21}$ to the second terminal of resistor $R_{20}$, as shown in FIG. 2 passes through the collector electrode of transistor 6, resistance $R_{18}$ and relay $K_{1e}$ to load 4 and a voltage is produced across series connected resistors $R_{13}$ and $R_{14}$. The output of the controller, from amplifier 1, produces a voltage across resistance $R_{12}$ through separating circuit 2, current transformer 3, relay $K_{1d}$ and dummy load $R_{11}$. The difference between the two voltages thus produced is applied to the amplifier 1 of the controller through lines 16 and 18, a voltage dividing network, and relays $K_{1a}$ and $K_{1b}$. As the gain of the amplifier is negative, the output of the amplifier follows the signal in the manual manipulator. One side of integrating condenser $C_2$ is connected to common line 19 through relay $K_{1c}$ and the other side of integrating condenser $C_2$ is connected to the slider of variable resistance $R_3$ through relay $K_2$ so that a voltage corresponding to the manual output current is applied to condenser $C_2$ through the current transformer 3. In this manner, when the electronic controlling instrument is changed over from the manual to automatic position, the output of the amplifier 1 and the charge on the condenser $C_2$ have followed the manual manipulator and the change over will therefore be free of unwanted fluctuations. Lines 13 and 14 connect to the controller power supply, not shown, line 11 connects to the coils or relays $K_1$ and $K_2$, and line 12 connects to an auxiliary unit, not shown.

When the prior art electric controlling instrument is operated automatically the output of the controller passes through separating circuit 2, current transformer 3 and relay $K_{1d}$ to load 4. The output of the manual manipulator is connected from the collector of transistor 6 through resistance $R_{17}$ and change over switch $S_2$ to switch $S_3$ and then to resistance $R_{15}$ when switch $S_3$ closes. When the valve balance switch $S_3$ is set at a balancing condition $B_1$ the output of the manual manipulator is matched with the output of the controller by adjusting variable resistance $R_{20}$ until the valve meter 5 is nulled. It is assumed that the resistivity of resistance $R_{14}$ is equal to the resistivity of resistance $R_{15}$. After this manipulation, switches $S_1$ and $S_2$ are changed over to manual.

From the description stated above it can be clearly understood that the automatic to manual change over system of the prior art is complicated and subject to error because the valve balance switch $S_3$ is necessary in addition to the automatic and manual change over switch. This is especially true when the electric process controlling instrument is changed over from the automatic to manual mode of operation if it happens that the manipulation of the switches is carried out in an incorrect sequence. In this invention, the faults stated above can be eliminated.

In FIG. 2, manual and automatic change over switches 7 and 7' operate in a unidirectional sequence beginning from manual to automatic to balance and then back to manual. Switches 7 and 7' are combined to be one switch in order to be kept interlocked, as indicated by dashed line 8. A three position, unidirectional push button is provided with a lamp indicating the change over switch condition. $E_1$ is an electrical source for the manual manipulator and $E_2$ is an electrical source for energizing the relays $K_1$, $K_2$, and $K_M$ whose coils are shown in the lower portion of FIG. 2 and whose contacts are shown in the upper portion thereof. One end of load 4 is connected to the collector of transistor 6 through manual or M position of relay KM and the other end of load 4 is connected to one end of resistance $R_{13}$. One end of output meter 5 is connceted to the junction point of resistances $R_{13}$ and $R_{14}$ and the other end of output meter 5 is connected to the common contact of change over switch 7. The manual or M position and automatic or A position of change over switch 7 are connected together to the positive terminal of electric source $E_1$ through resistance $R_{25}$. One end of resistance $R_{23}$ is connected to resistance $R_{25}$ and the other end of resistance $R_{23}$ is connected to common line 17 which connects to the separating circuit 2, shown in FIG. 1. The balance or B position of change over switch 7 is connected to the collector of transistor 6 through resistance $R_{24}$ and the A position of relay KM. One end of resistance $R_{15}$ is connected to resistance $R_{24}$ and the other end of resistance $R_{15}$ is connected to common line 17. A serial connection of biasing resistance $R_{21}$ and bias adjusting resistance $R_{20}$ is connected between the positive terminal and the negative terminal of source $E_1$, said negative terminal being connected to common line 17.

One terminal of load 4 is also connected to current transformer 3 through automatic or A position of relay $K_1$ and line 15, while the other terminal of load 4 is connected to the input terminal of amplifier 1, shown in FIG. 1, through line 16. A serial combination of dummy load $R_{11}$ and resistance $R_{12}$ is connected to current transformer 3 through manual or M position of relay $K_1$ and line 15, while the junction point of dummy load $R_{11}$ and resistance $R_{12}$ is connected to the input terminal of amplifier 1, FIG. 1, through line 18. The resistivity of resistance $R_{12}$ is equal to the sum of the resistivities of resistances $R_{13}$ and $R_{14}$.

The manual or M position of change over switch 7' is connected to common line 17 through resistance $R_{26}$ and the automtic or A position and balance or B position of switch 7' are connected to one end of relay coil KM. A serial connection of relay coil $K_1$ and relay coil KM is used for changing over from the automatic to manual mode of operations and a serial connection of relay coil $K_2$ therewith is used to short circuit or open a differential resistance $R_2$, shown in FIG. 1. Resistance $R_{27}$ is connected between the positive and negative terminals of electric source $E_2$ in series with switches $S_5$ and $S_6$ and relay coils $K_1$ and $K_2$.

In operation, assuming the condition of the electronic controlling instrument is in the manual mode, the current for manual manipulation flows to load 4 through the M position of relay KM and then to resistances $R_{13}$ and $R_{14}$. This current corresponds to the position of the slider of variable resistance $R_{20}$. At this time, a bias voltage corresponding to the mean value of the output manual manipulator current is applied to the side of meter 5 which connects to switch 7. The voltage drop across resistances $R_{13}$ and $R_{14}$ is fed back to the controller through line 16 and is applied to dummy load $R_{11}$ and resistance $R_{12}$ through M point of relay $K_1$. Since the resistivity of $R_{12}$ is equal to the sum of the resistivities of $R_{13}$ and $R_{14}$, the difference between the voltage drop across $R_{12}$ and the voltage drop across $R_{13}$ and $R_{14}$ represents the difference between the output of the controller and the output of the manual manipulator. The difference is fed back to the amplifier of the controller and, since the gain thereof is negative, causes the output of the amplifier to automatically correct itself to coincide with the output of the manual manipulator. At this time, if change over switches 7 and 7' are changed over from manual to automatic modes of operation, relays $K_1$, $K_2$, and $K_M$ are energized and the contacts thereof are changed over to automatic, or A position.

As explained hereinabove with reference to FIG. 1, a voltage corresponding to the manual output is charged on the feedback condenser $C_2$ during the time the controller operates in the manual mode. Thus, when the controller is changed over from the manual to the automatic mode of operation the charge on the condenser $C_2$ has followed the value of the manual manipulator output and the output current of the controller therefore does not vary. While in automatic operation, the output current of the controller passes through the load and the output current of the manual manipulator passes through resistances $R_{24}$ and $R_{15}$.

When the automatic operation is to be changed over to the manual operation it is necessary to coincidence the output of the manual manipulator which the output of the controller. Therefore, under a condition in which the electronic process controlling instrument is changed over form the automatic to the manual mode of operation, if change over switches 7 and 7' are operated, the balance condition is always obtained, due to the unidirectional features thereof. In the balance mode the output of meter 5 acts as a galvanometer to sense the difference in voltage drop across resistors $R_{14}$ and $R_{15}$. Variation of resistance $R_{20}$, by means of the knob not shown, causes the output of the manual manipulator to coincide with the output of the controller. When the balancing operation is completed, as indicated by a null condition of output meter 5, change over switches 7 and 7' are operated further and changed over from the balance mode to the manual mode of operation without introducing a disturbance to the load.

It will be clearly understood from the above description that the change over from the automatic to the manual mode of operation is simply effected by means of the single unidirectional change over switch and the sequence of operation is always is always from manual to automatic to balance and back to manual agin. Therefore, no error in electronic controlling instrument mnipulation can occur and the manipulation thereof is greatly simplified.

When the controller is removed from the electronic process controlling instrument during its operation, it should be performed after the change over switch is changed over to the manual mode position. However, during the automatic operation if the controller is removed, the energizing power for the relays is also removed and relay KM opens to change over from the automatic to the manual mode. When the removed controller is set in operation again it is necessary to place the change over switch 7 and 7' in the manual position. If the switch is at the automatic position and the instrument is placed in operation, the resulting change over to automatic without balancing the controller output with the manual output, will give a large shock to the load.

To prevent the error in manipulation, a switch $S_6$ is inserted in series with relay $K_1$, $K_2$. Switch $S_6$ operates in combination with a mounting screw associated with the controller. In other words, when the controller is removed by backing out the screw the switch $S_6$ opens. When the controller is returned to the chassis by the screw, the tip of the screw pushes the actuator of switch $S_6$ for closing the switch $S_6$ after the screw is fully tightened. By using switch $S_6$, the output of the controller follows the output of the manual manipulator during the tightening the screw which allows the controller capacitors to become charged and prevents a shock to the load. After the screw tightening is completed the automatic operation of the controller is returned if the switch remains in that mode.

While a preferred embodiment of the present invention is disclosed, it is recognized that the scope of the present invention is not limited thereto and it is therefore intended that the scope of the present invention be defined by the scope of the appended claims.

What is claimed is:

1. An electronic process controlling instrument for providing automatic or manual modes of control to a load comprising:

a controller having first and second input means and first and second output means, a common line connected to said second controller output means, a manual manipulator having first and second output means, impedance means forming a dummy load connected to said common line, first switching means connecting said first output of said controller alternately to said dummy load in said manual mode and to said load in said automatic mode, load current sensing impedance means connected between said load and said common line, first meter biasing impedance means connected between said common line and said second output of said manual manipulator, second meter biasing impedance means connected to said common line, second switching means connecting said first output of said manual manipulator alternately to said load in said manual mode and to said second meter biasing impedance means in said automatic mode, unidirectional switching means including manual, automatic, and balancing positions and a common contact, meter means connected from said common contact of said unidirectional switching means to a point on said load current sensing impedance means, said unidirectional switching means being arranged to connect a point on said first meter biasing impedance means with said common contact when in said manual position and said automatic position, and said unidirectional switching means being further arranged for connecting a point on said second meter biasing impedance means with said common contact when in said balance position for automatically placing said meter in a nulling arrangement to automatically indicate a balanced condition between said controller and said manual manipulator before placing said unidirectional switching means into said manual position, thereby preventing errors which would cause disturbance to said load.

2. An electronic process controlling instrument as claimed in claim 1 additionally comprising:

said manual manipulator having a source of potential and adjustable resistance means for varying the output thereof, said load current sensing impedance means including more than one serially connected resistance means, said second meter biasing impedance means including more than one serially connected resistance means, said meter means having a first terminal connected between said serially connected load current sensing resistance means and a second terminal connected to said common contact of said unidirectional switching means, said unidirectional switching means arranged to operate in one unidirectional sequence from manual to automatic to balance and back to manual again, and said unidirectional switching means being further arranged to connect a point between said second meter biasing serially connected resistance means and said common contact when sequentially switching from automatic to balance for automatically placing said meter means in a null position to indicate a balanced condition between said controller and said manual manipulator which may be adjusted by manipulation of said adjustable resistance means before sequentially switching said unidirectional switch to manual.

References Cited

UNITED STATES PATENTS

| | | |
|---|---|---|
| 2,644,642 | 7/1953 | Smoot. |
| 2,679,022 | 5/1954 | McIlhenny. |
| 3,069,554 | 12/1962 | Decker et al. |
| 3,077,552 | 2/1963 | Koppel. |

ORIS L. RADER, *Primary Examiner.*

T. B. JOIKE, *Assistant Examiner.*

UNITED STATES PATENT OFFICE
CERTIFICATE OF CORRECTION

Patent No. 3,340,408　　　　　　　　　　　September 5, 1967

Shinichiro Ogawa et al.

It is hereby certified that error appears in the above numbered patent requiring correction and that the said Letters Patent should read as corrected below.

In the drawings, sheet 1, strike out "Fig. 3".

Signed and sealed this 29th day of October 1968.

(SEAL)
Attest:

Edward M. Fletcher, Jr.　　　　　　　　　　EDWARD J. BRENNER
Attesting Officer　　　　　　　　　　　　　Commissioner of Patents